US008677264B2

(12) United States Patent
Takami

(10) Patent No.: US 8,677,264 B2
(45) Date of Patent: Mar. 18, 2014

(54) INFORMATION PROCESSING APPARATUS, TERMINAL APPARATUS, CONTENT OF INTEREST DETERMINATION METHOD, CONTENT OF INTEREST DETERMINATION PROGRAM, TERMINAL PROGRAM, RECORDING MEDIUM ON WHICH PROGRAM IS RECORDED, AND INFORMATION PROVISION SYSTEM

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/511,730

(22) PCT Filed: Nov. 18, 2010

(86) PCT No.: PCT/JP2010/070598
§ 371 (c)(1), (2), (4) Date: May 24, 2012

(87) PCT Pub. No.: WO2011/065284
PCT Pub. Date: Jun. 3, 2011

(65) Prior Publication Data
US 2012/0290971 A1  Nov. 15, 2012

(30) Foreign Application Priority Data

Nov. 26, 2009  (JP) .................................. 2009-268802
Nov. 26, 2009  (JP) .................................. 2009-268804

(51) Int. Cl.
*G06F 3/00*  (2006.01)
(52) U.S. Cl.
USPC ........... 715/786; 715/785; 715/776; 715/814; 715/854; 715/833

(58) Field of Classification Search
USPC ................. 715/786, 785, 776, 814, 854, 833
See application file for complete search history.

(56) References Cited

U.S. PATENT DOCUMENTS

| 5,283,864 | A  | * | 2/1994  | Knowlton ........................ 715/776 |
| 5,363,481 | A  | * | 11/1994 | Tilt .............................. 715/814 |
| 6,317,144 | B1 | * | 11/2001 | Pabla et al. ..................... 715/854 |
| 6,590,594 | B2 | * | 7/2003  | Bates et al. ..................... 715/784 |
| 6,677,965 | B1 | * | 1/2004  | Ullmann et al. ............... 715/786 |

(Continued)

FOREIGN PATENT DOCUMENTS

| JP | 2001-51925 A  | 2/2001 |
| JP | 2005-108000 A | 4/2005 |

(Continued)

OTHER PUBLICATIONS

International Search Report for PCT/JP2010/070598 dated Dec. 21, 2010.

(Continued)

*Primary Examiner* — Michael Roswell
(74) *Attorney, Agent, or Firm* — Sughrue Mion, PLLC

(57) ABSTRACT

Content is displayed in an active display region of a terminal apparatus, and information relating to the display of said content when the content scrolls in accordance with a scrolling operation performed by a user and content identifying information for identifying the content are obtained from the terminal apparatus and it is determined whether or not the user of the terminal apparatus is interested in the content identified by the content identifying information that is extracted in accordance with the information relating to the display of the content.

6 Claims, 11 Drawing Sheets

(56) References Cited

U.S. PATENT DOCUMENTS

| | | | |
|---|---|---|---|
| 7,765,491 B1* | 7/2010 | Cotterill | 715/833 |
| 2002/0186251 A1* | 12/2002 | Himmel et al. | 345/784 |
| 2008/0082940 A1* | 4/2008 | Morris | 715/786 |
| 2009/0228828 A1* | 9/2009 | Beatty et al. | 715/786 |
| 2010/0146387 A1* | 6/2010 | Hoover | 715/702 |
| 2011/0119620 A1* | 5/2011 | Schon et al. | 715/785 |

FOREIGN PATENT DOCUMENTS

| | | |
|---|---|---|
| JP | 2006-252505 A | 9/2006 |
| JP | 2008-198171 A | 8/2008 |
| WO | 2009/116317 A1 | 9/2009 |

OTHER PUBLICATIONS

European Search Report dated Feb. 14, 2013, issued for European Application No. 12171456.2.

Xie Xing et al., "Learning User Interest for Image Browsing on Small-form-factor Devices," Proceedings of the Sigchi Conference on Human Factors in Computing Systems (CHI '05), Apr. 7, 2005, pp. 671-680, XP055051421, New York, New York, USA.

B. Baccot et al., "Visual Attention Metadata from Pictures Browsing," Image Analysis for Multimedia Interactive Services, 2008 (WIAMIS '08), Ninth International Workshop ON, IEEE, May 7, 2008, pp. 122-125, XP031281838, Picsataway, NJ, USA.

R. Atterer et al., "Knowing the Users Every Move—User Activity Tracking for Website Usability Evaluation and Implicit Interaction," Proceedings on the 15th International Conference on World Wide Web (WWW '06), ACM, May 22, 2006, pp. 203-212, XP002519605, New York, New York, USA.

Chinese Office Action for Chinese Application No. 201210221924.5 dated Apr. 19, 2013.

Canadian Office Action dated Aug. 21, 2013 issued in Patent Application No. 2,781,945.

Miikka Miettinen, "On the Feasibility of Supporting Encyclopedia Navigation with Proactive Search", Dec. 9, 2003, XP055091007, 16 pages.

* cited by examiner

FIG.3A
221
USER INFORMATION DB
- USER ID
- NAME
- GENDER
- ADDRESS
- TELEPHONE NUMBER
- EMAIL ADDRESS
- ......

FIG.3B
222
AUTHENTICATION INFORMATION DB
- USER ID
- LOGIN ID
- PASSWORD

FIG.3C
223
RELATED CONTENT INFORMATION DB
- CONTENT ID
- RELATED CONTENT INFORMATION

FIG.3D
224
OPERATION INFORMATION DB
- USER ID
- PAGE ID
- SCROLL CHANGE AMOUNT INFORMATION
- SCROLL DIRECTION LENGTH INFORMATION
- CONTENT DISPLAY AREA INFORMATION
- ......

FIG.3E
225
INTEREST PRESENCE OR ABSENCE INFORMATION DB
- USER ID
- PAGE ID
- CONTENT ID
- INTEREST PRESENCE OR ABSENCE INFORMATION

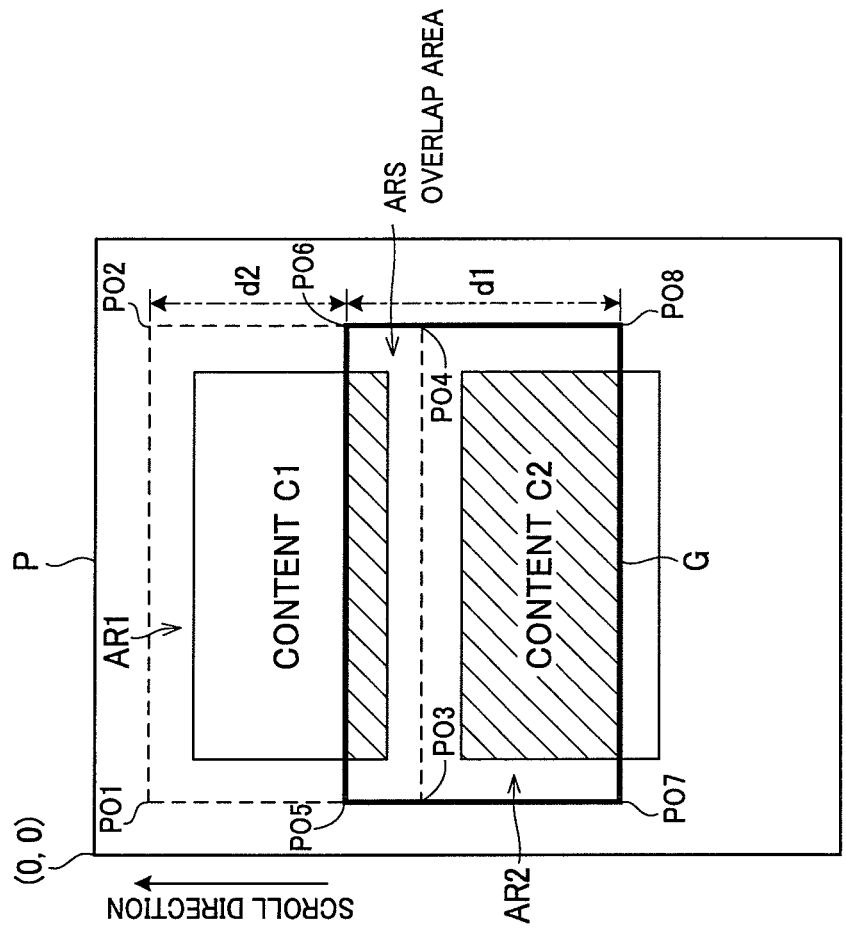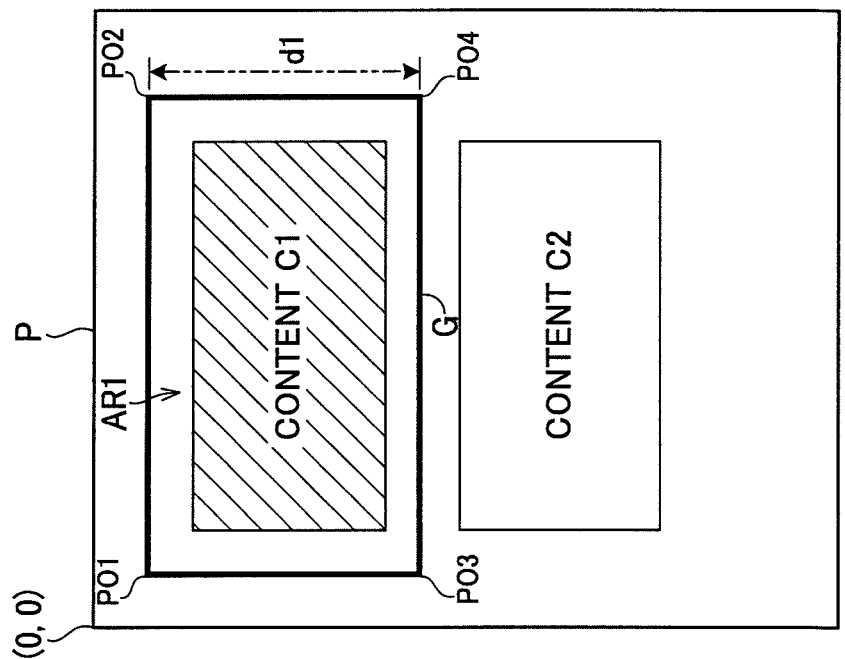

INFORMATION PROCESSING APPARATUS, TERMINAL APPARATUS, CONTENT OF INTEREST DETERMINATION METHOD, CONTENT OF INTEREST DETERMINATION PROGRAM, TERMINAL PROGRAM, RECORDING MEDIUM ON WHICH PROGRAM IS RECORDED, AND INFORMATION PROVISION SYSTEM

CROSS REFERENCE TO RELATED APPLICATIONS

This application is a National Stage of International Application No. PCT/JP2010/070598 filed Nov. 18, 2010, claiming priority based on Japanese Patent Application Nos. 2009-268802 filed Nov. 26, 2009 and 2009-268804 filed Nov. 26, 2009, the contents of all of which are incorporated herein by reference in their entirety.

TECHNICAL FIELD

The present invention relates to a technical field for determining a degree of interest in a web page provided from a website on the Internet.

BACKGROUND ART

There are a large number of websites on the Internet and these websites publish a wide variety of information. A user terminal connected to the Internet accesses a website by specifying a URL (Uniform Resource Locator) of the website by a web browser, so that the user terminal can display a web page provided from the website. Thereby, a user of the user terminal can browse information posted on a web page provided from the website. Therefore, it is important for a provider of the information posted on the webpage to know the level of interest of the user (degree of interest) in the web page and the information posted thereon.

Conventionally, a method is known which determines the user's degree of interest on the basis of a browsing time of a web page (staying time in a web page). In this method, the longer the browsing time of the web page, the higher the user's degree of interest is determined to be. For example, Patent Document 1 discloses a technique for measuring an elapsed time by using transition of a web page as an end event and transmitting the elapsed time to a server as the browsing time of each web page.

CITATION LIST

Patent Document

Patent Document 1: Japanese Patent Application Laid-Open No. 2001-51925

SUMMARY OF THE INVENTION

Problems to be Solved by the Invention

By the way, various contents are included in one web page and these contents can be displayed by scrolling in an active display area on a display unit of a user terminal according to a scroll operation by a user.

However, like the technique disclosed in Patent Document 1 described above, it is difficult to determine which content (in other words, which display area in the web page) the user is interested in among a plurality of contents included in the web page using the method disclosed in the Patent Document 1 that determines the user's degree of interest on the basis of the browsing time of the web page or the like.

The present invention is made in view of the above problem and the like and an example of the object of the present invention is to provide an information processing apparatus, a terminal apparatus, a content of interest determination method, a content of interest determination program, a terminal program, a recording medium with a program recorded thereon, and an information providing system, which are able to determine which content a user is interested in among a plurality of contents included in a web page.

Means for Solving the Problem

In order to achieve the above object, an information processing apparatus described in an exemplary embodiment includes an information obtaining means that obtains information related to display of content when the content displayed in an active display area of a terminal apparatus scrolls according to a scroll operation by a user and content identification information for identifying the content from the terminal apparatus; a storage means that stores the obtained information related to display of the content and the content identification information in association with each other; and a determination means that extracts the information related to display of the content and the content identification information from the storage means and determines whether or not a user of the terminal apparatus is interested in the content identified by the extracted content identification information on the basis of the extracted information related to display of the content. According to this invention, it is possible to quickly determine which content the user is interested in among a plurality of contents.

The information processing apparatus in accordance with an exemplary embodiment, wherein the information obtaining means obtains amount of change information that indicates an amount of change in the content when the content scrolls according to a scroll operation by a user and length information that indicates a length of the active display area in a direction of the scroll as the information related to display of the content, the storage means stores the obtained amount of change information, the length information, and the content identification information in association with each other; and the determination means extracts the amount of change information, the length information, and the content identification information from the storage means and determines whether or not an amount of change indicated by the extracted amount of change information is smaller than or equal to a length indicated by the extracted length information, and if the determination means determines that the amount of change is smaller than or equal to the length, the determination means determines that the user of the terminal apparatus is interested in the content identified by the extracted content identification information. According to this invention, it is possible to quickly determine which content the user is interested in among a plurality of contents.

The information processing apparatus in accordance with an exemplary embodiment, wherein the information obtaining means obtains content display area information related to display areas of content displayed in the active display area before and after scroll when the content scrolls according to a scroll operation by a user as the information related to display of the content, the storage means stores the obtained content display area information and the content identification information in association with each other, and the determination means extracts the content display area information and the content identification information from the storage means and determines whether or not the display areas of content displayed in the active display area before and after the scroll overlap each other on the basis of the extracted content display area information, and if the display areas of content before and after the scroll overlap each other, the determination means determines that the user of the terminal apparatus is interested in the content identified by the extracted content identification information. According to this invention, it is possible to quickly determine which content the user is interested in among a plurality of contents.

The information processing apparatus in accordance with an exemplary embodiment, further comprising: a related content selection means that selects a related content that is related to the content in which the user is determined to be interested; and a related content presentation means that presents the selected related content to the user of the terminal apparatus. According to this invention, it is possible to present information in which the user may be more interested and recommend a product or a service more effectively thereby.

A content of interest determination method in accordance with an exemplary embodiment performed by a computer, the method comprising: a step of obtaining information related to display of content when the content displayed in an active display area of a terminal apparatus scrolls according to a scroll operation by a user and content identification information for identifying the content from the terminal apparatus; a step of storing the obtained information related to display of the content and the content identification information in association with each other; and a step of extracting the information related to display of the content and the content identification information from the storage means and determining whether or not a user of the terminal apparatus is interested in the content identified by the extracted content identification information on the basis of the extracted information related to display of the content.

A content of interest determination program in accordance with an exemplary embodiment causing a computer to function as: an information obtaining means that obtains information related to display of content when the content displayed in an active display area of a terminal apparatus scrolls according to a scroll operation by a user and content identification information for identifying the content from the terminal apparatus, a storage means that stores the obtained information related to display of the content and the content identification information in association with each other, and a determination means that extracts the information related to display of the content and the content identification information from the storage means and determines whether or not a user of the terminal apparatus is interested in the content identified by the extracted content identification information on the basis of the extracted information related to display of the content.

A recording medium in accordance with an exemplary embodiment that stores the content of interest determination program causing a computer to function as: an information obtaining means that obtains information related to display of content when the content displayed in an active display area of a terminal apparatus scrolls according to a scroll operation by a user and content identification information for identifying the content from the terminal apparatus, a storage means that stores the obtained information related to display of the content and the content identification information in association with each other, and a determination means that extracts the information related to display of the content and the content identification information from the storage means and determines whether or not a user of the user terminal apparatus is interested in the content identified by the extracted content identification information on the basis of the extracted information related to display of the content.

A terminal apparatus in accordance with an exemplary embodiment comprising: an information obtaining means that obtains information related to display of content when the content displayed in an active display area of the terminal apparatus scrolls according to a scroll operation by a user and content identification information for identifying the content; a storage means that stores the obtained information related to display of the content and the content identification information in association with each other; and a determination means that extracts the information related to display of the content and the content identification information from the storage means and determines whether or not a user of the terminal apparatus is interested in the content identified by the extracted content identification information on the basis of the extracted information related to display of the content.

A terminal program in accordance with an exemplary embodiment causing a computer to function as: an information obtaining means that obtains information related to display of content when the content displayed in an active display area of a terminal apparatus scrolls according to a scroll operation by a user and content identification information for identifying the content, a storage means that stores the obtained information related to display of the content and the content identification information in association with each other, and a determination means that extracts the information related to display of the content and the content identification information from the storage means and determines whether or not a user of the user terminal apparatus is interested in the content identified by the extracted content identification information on the basis of the extracted information related to display of the content.

A recording medium in accordance with an exemplary embodiment that records a terminal program causing a computer to function as: an information obtaining means that obtains information related to display of content when the content displayed in an active display area of a terminal apparatus scrolls according to a scroll operation by a user and content identification information for identifying the content, a storage means that stores the obtained information related to display of the content and the content identification information in association with each other, and a determination means that extracts the information related to display of the content and the content identification information from the storage means and determines whether or not a user of the user terminal is interested in content identified by the extracted content identification information on the basis of the extracted information related to display of the content.

An information providing system in accordance with an exemplary embodiment including a terminal apparatus and a server apparatus which the terminal apparatus can access via a network, the information providing system wherein the terminal apparatus includes an information obtaining means that obtains information related to display of content when the content displayed in an active display area of the terminal apparatus scrolls according to a scroll operation by a user and content identification information for identifying the content from the terminal apparatus and a transmission means that transmits the obtained information related to display of the content and the content identification information to the server apparatus, and the server apparatus includes a reception means that receives the information related to display of the content and the content identification information transmitted from the terminal apparatus, a storage means that stores the received information related to display of the content and the content identification information in association with each other, and a determination means that extracts the information related to display of the content and the content identification information from the storage means and determines whether or not a user of the terminal apparatus is interested in the content identified by the extracted content identification information on the basis of the extracted information related to display of the content.

Effect of the Invention

According to the present invention, it is possible to quickly determine which content the user is interested in among a plurality of contents.

BRIEF DESCRIPTION OF THE DRAWINGS

FIG. 3A is a diagram showing a configuration example of information registered in user information database.

FIG. 3B is a diagram showing a configuration example of information registered in authentication information database.

FIG. 3C is a diagram showing a configuration example of information registered in related content database.

FIG. 3D is a diagram showing a configuration example of information registered in operation information database.

FIG. 3E is a diagram showing a configuration example of information registered in interest presence or absence information database.

FIG. 5A is a conceptual diagram (I) of a web page shown in a window screen.

FIG. 5B is a conceptual diagram (II) of a web page shown in a window screen.

MODES FOR CARRYING OUT THE INVENTION

Hereinafter, embodiments of the present invention will be described with reference to the drawings. The embodiments described below are embodiments in a case in which the present invention is applied to an information providing system.

[1. Outline of a Configuration and Functions of the Information Providing System]

Figure 1:
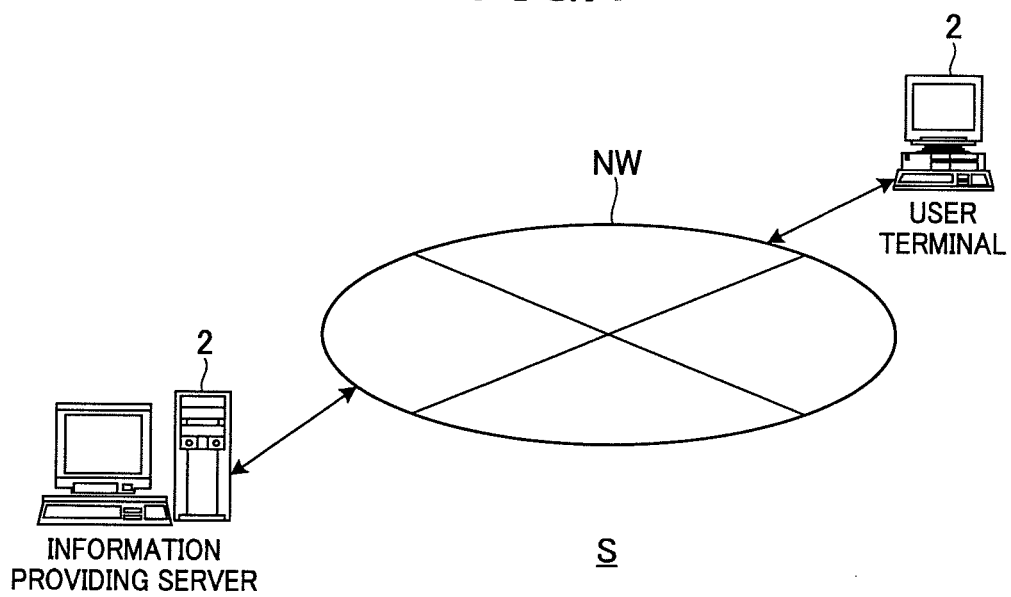
FIG. 1 is a diagram showing an example of a schematic configuration of an information providing system S according to embodiments.

First, an outline of a configuration and functions of an information providing system S according to an embodiment of the present invention will be described with reference to FIG. 1. FIG. 1 is a diagram showing an example of a schematic configuration of the information providing system S according to the embodiment. As shown in FIG. 1, the information providing system S includes a user terminal 1 (an example of a terminal apparatus) and an information providing server 2 (an example of an information providing apparatus or a server apparatus). Although only one user terminal 1 is shown in FIG. 1 for the convenience of description, there are many user terminals 1 used by each user.

The user terminal 1 and the information providing server 2 can transmit and receive data to and from each other via a network NW by using, for example, TCP/IP as a communication protocol. The network NW is made up of, for example, the Internet, a dedicated communication line (for example, CATV (Community Antenna Television) line), a mobile communication network (including a base station and the like), gateways, and the like.

The user terminal 1 is, for example, a personal computer (PC), a PDA (Personal Digital Assistant), a mobile phone, or a portable game machine, and has a web browser function. The user terminal 1 accesses the information providing server 2 and obtains a web page by a web browser, and then displays (renders) the web page in a window screen appearing on the display. Thereby, the content including at least one of a moving image, a still image, and a text is displayed in the window screen. The window screen is an active display area in the web browser. The active display area is the entire screen in a full-Screen display mode. The web page is made up of, for example, a structured document file such as an HTML (Hyper Text Markup Language) or XML (Extensible Markup Language) file, image data, and the like. Each web page is added a unique page ID. For example, the page ID may be a URL of the web page.

When a part of display area of the web page cannot be accommodated in the window screen appearing on the display of the user terminal 1, the web browser of the user terminal 1 scrolls (moves) the web page (that is, content displayed on the web page) in the horizontal direction (lateral direction), the perpendicular direction (vertical direction), or an oblique direction in the window screen according to a scroll operation by a user. The scroll is performed from when the user starts the scroll operation to when the user completes the scroll operation. Here, examples of the scroll operation by the user include that the user rotates a wheel (a button between the left and right buttons) of a mouse (an operation unit of the user terminal 1), the user moves a scroll bar displayed near the window screen by a drag function of the mouse, the user presses an up, down, left, or right key of a keyboard (an operation unit of the user terminal 1), the user drags the window screen and moves the active display area in an arbitrary direction by using a pointing device such as the mouse, the user flicks (for example, lightly flicks with a finger) on a touch panel window screen and the like.

The web browser of the user terminal 1 obtains information related to display of a web page (content) when the web page (the content) displayed in a window screen (that is, an active display area of the web browser) is scrolled according to a scroll operation by the user. For example, the web browser of the user terminal 1 obtains scroll change amount information indicating an amount of change of a web page (content) displayed in a window screen (that is, an active display area of the web browser) when the web page (the content) is scrolled according to a scroll operation by the user as the information related to display of the content. Here, the amount of change corresponds to, for example, a distance between first coordinates and second coordinates when a certain pixel (or pixels) in the content displayed in the window screen moves from the first coordinates to the second coordinates on the screen.

The web browser of the user terminal 1 obtains the length of the window screen in a direction of the scroll, that is, scroll direction length information (length information), which indicates the length of the active display area of the web browser, as the information related to display of the content. Further, as described above, the web browser of the user terminal 1 obtains content display area information (for example, coordinates of the content display area on the web page) related to the content display area displayed in the window screen before and after scroll when the web page is scrolled.

The web browser of the user terminal 1 creates an operation information file including the above-described scroll change amount information, the above-described scroll direction length information, the above-described content display area information, and a page ID of the web page related to the above-described scroll. Here, the content display area information and the page ID are examples of content identification information for identifying the content displayed in the window screen. The scroll change amount information and the scroll direction length information may not be included in the operation information file.

The web browser of the user terminal 1 transmits the created operation information file and a user ID stored in the user terminal 1 to the information providing server 2 via the network NW. The information related to display of the content included in the operation information file is transmitted to the information providing server 2 as information used to determine that an interest is shown for the content.

Here, a program for obtaining the information related to display of the content (for example, the scroll change amount information, the scroll direction length information, and the content display area information) and creating and transmitting the operation information file is described in, for example, a structured document constituting the web page by a script language (for example, JavaScript (registered trademark)). Alternatively, the program for obtaining the scroll change amount information, the scroll direction length information, and the content display area information, and creating and transmitting the operation information file may be plugged in to the web browser of the user terminal 1 in advance.

The transmission timing of the operation information file and the like is, for example, when the scroll operation for performing the scroll is ended. If the start of scroll and the end of scroll are repeatedly performed while a web page is displayed, every time the above operation is performed, the operation information file and the user ID are transmitted to the information providing server 2.

[2. Configuration and Functions of the Information Providing Server 2]

Figure 2:
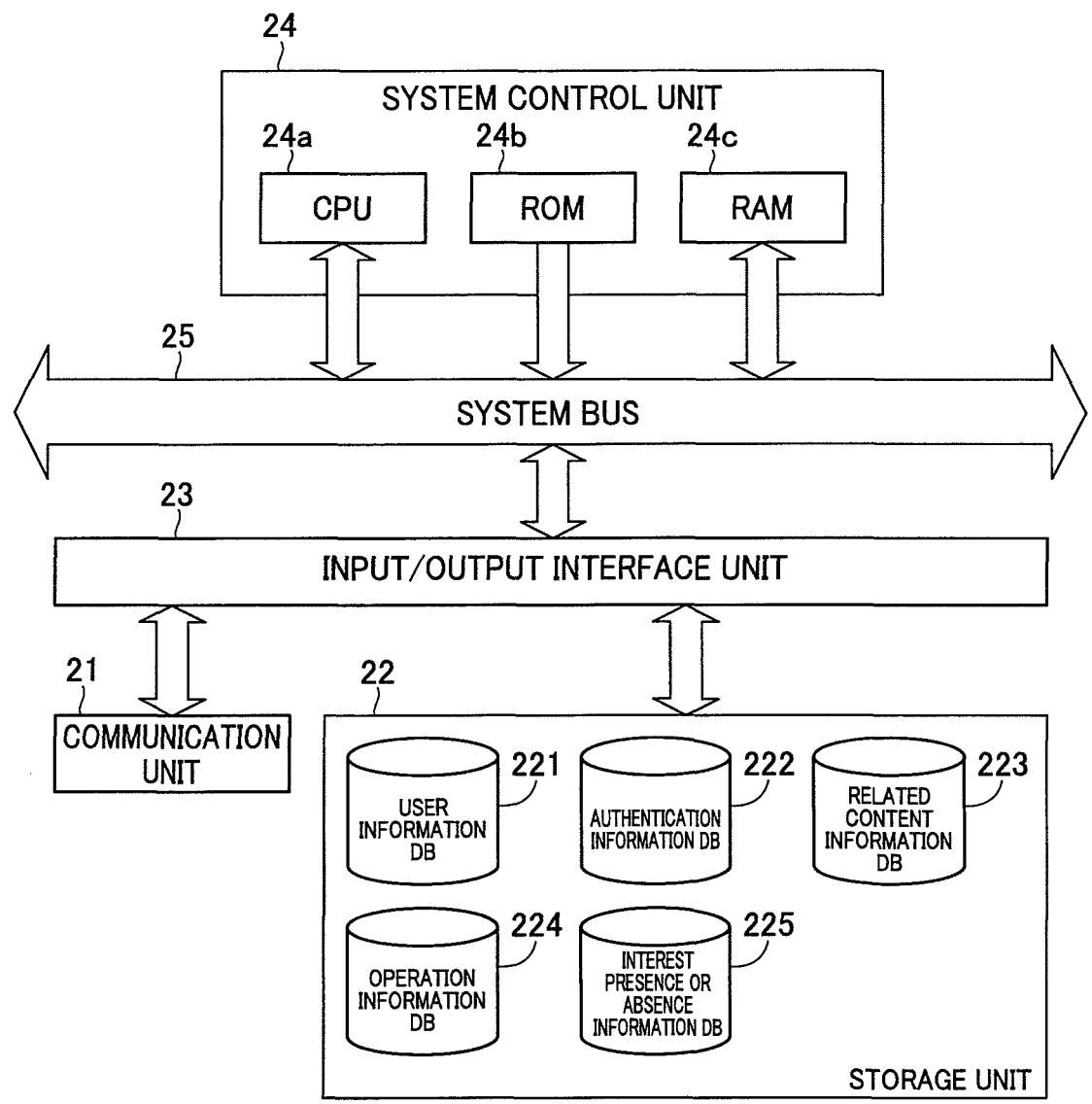
FIG. 2 is a block diagram showing an example of a schematic configuration of an information providing server 2 according to the embodiments.

Next, the configuration and the functions of the information providing server 2 will be described with reference to FIG. 2. FIG. 2 is a block diagram showing an example of a schematic configuration of the information providing server 2 according to the embodiment.

As shown in FIG. 2, the information providing server 2 includes a communication unit 21, a storage unit 22, an input/output interface unit 23, and a system control unit 24. The system control unit 24 and the input/output interface unit 23 are connected to each other via a system bus 25.

The communication unit 21 connects to the network NW and controls a state of communication with the user terminal 1.

The storage unit 22 is made up of, for example, a hard disk drive, and stores various programs such as an operating system, the content of interest presence or absence determination program and the like. For example, the content of interest presence or absence determination program of the present invention may be obtained (downloaded) from other server or the like via the network NW or may be stored in a recording medium such as a CD (Compact Disc) or a DVD (Digital Versatile Disc) to be read via a drive apparatus.

The storage unit 22 (an example of a storage means) stores data for forming each of a plurality of web pages to be provided to the user terminal 1.

In the storage unit 22, a user information database (DB) 221, an authentication information database (DB) 222, a related content information database (DB) 223, an operation information database (DB) 224, and a degree of interest presence or absence information database (DB) 225 are formed.

FIGS. 3A, 3B, 3C, 3D, and 3E are diagrams showing a configuration example of the information registered in each database.

In the user information database 221 shown in FIG. 3A, user information such as user ID, name, gender, address, telephone number, email address of users registered as members and the like is associated with each user and registered.

In the authentication information database 222 shown in FIG. 3B, user ID, login ID, and password are associated with each user and registered. The login ID and the password are authentication information used for a login process (user authentication process).

In the related content information database 223 shown in FIG. 3C, content IDs of each content displayed on the web page, related contents (for example, advertisement information and detailed information) that are related to each content, and the like are associated with each content and registered.

In the operation information database 224 shown in FIG. 3D, user ID, page ID, scroll change amount information, scroll direction length information, and content display area information are associated with each user and each web page and registered. Here, the scroll change amount information and the scroll direction length information may not be registered in the operation information database 224.

In the interest presence or absence information database 225 shown in FIG. 3E, user ID, page ID, content ID, and interest presence or absence information are associated with each user and each web page and registered. Here, the interest presence or absence information indicates whether or not a user is interested in the content on the web page. The content ID includes an ID and a URI (for example, file name) in a tag described in a structured document constituting the web page or coordinates of a display area of the content on the web page and the like.

When a plurality of contents are set on one web page, interest presence or absence information and content ID are associated with each content and registered.

The input/output interface unit 23 performs an interface process among the communication unit 21, the storage unit 22, and the system control unit 24.

The system control unit 24 includes a CPU (Central Processing Unit) 24a, a ROM (Read Only Memory) 24b, a RAM (Random Access Memory) 24c, and the like. The CPU 24a reads and executes various programs stored in the ROM 24b and/or the storage unit 22, so that the system control unit 24 performs a process for providing a web page and the like.

Further, the system control unit 24 functions as an information obtaining means, a determination means, a related content selection means, a related content presentation means, and the like of the present invention.

Specifically, the system control unit 24 obtains the operation information file and the user ID transmitted from the user terminal 1 and registers (stores) the scroll change amount information, the scroll direction length information, the content display area information, and the page ID included in the operation information file in the operation information database 224 in association with the user ID.

Then, the system control unit 24 extracts information related to display of the content and page ID associated with a user ID of a certain user from the operation information database 224, and determines whether or not the user of the user terminal 1 is interested in the content identified by the extracted information related to display of the content on the basis of the extracted information related to display of the content. For example, the system control unit 24 extracts the scroll change amount information, the scroll direction length information, the content display area information, and the page ID which are associated with a user ID of a certain user from the operation information database 224, and determines whether or not the amount of change indicated by the extracted scroll change amount information is smaller than the length indicated by the extracted scroll direction length information. If the amount of change is smaller than the length, the system control unit 24 determines that the user is interested in the content (the content displayed in one or both of the window screens before and after the scroll) on the web page identified by the extracted page ID and the content display area information.

Alternatively, the system control unit 24 obtains the operation information file and the user ID transmitted from the user terminal 1 and registers (stores) the content display area information and the page ID included in the operation information file in the operation information database 224 in association with the user ID. In this case, the system control unit 24 extracts the content display area information and the page ID which are associated with a user ID of a certain user from the operation information database 224, and determines whether or not the display areas of the content displayed in the window screens before and after the scroll overlap each other on the basis of the extracted content display area information. If the display areas of the content before and after the scroll overlap each other, the system control unit 24 determines that the user is interested in the content (the content displayed in one or both of the window screens before and after the scroll) on the web page identified by the extracted page ID and the content display area information.

The page interest presence or absence information indicating the presence or absence of the interest determined as described above is associated with the page ID of the web page, the content ID, and the user ID and registered in the interest presence or absence information database 225. The system control unit 24 selects related content that is related to the content in which the user is determined to be interested by referring to the interest presence or absence information registered in the degree of interest presence or absence information database 225, and transmits the related content to the user terminal 1 via the network NW to present the related content to the user.

[3. Operation of the Information Providing System]

Next, an operation of the information providing system S according to the embodiment will be described.

First Embodiment (3.1. Creation and Transmission of Operation Information File)

First, the process for creating and transmitting the operation information file by the user terminal 1 according to a first embodiment will be described with reference to FIG. 4.

Figure 4:
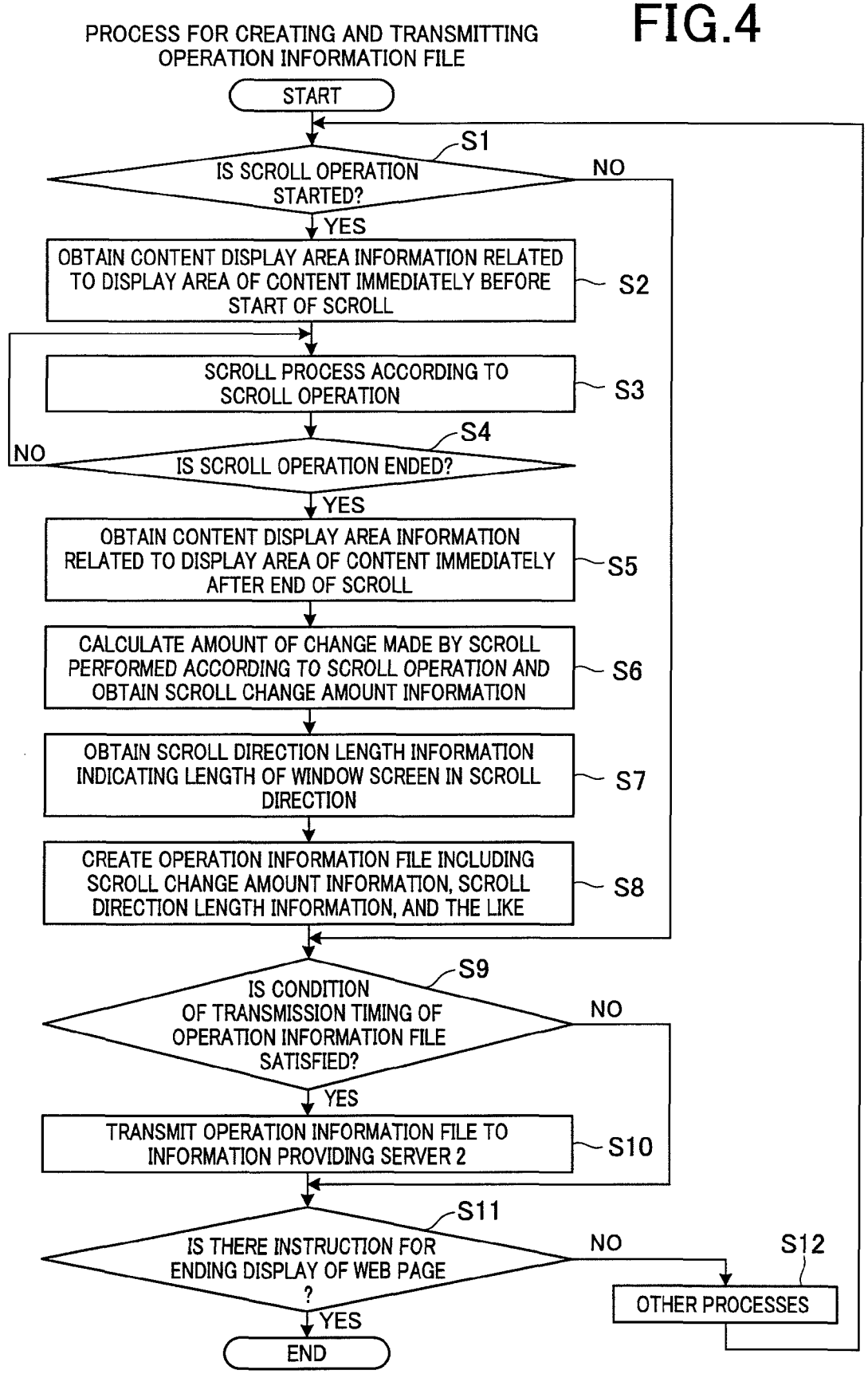
FIG. 4 is a flowchart showing a process of creating and transmitting an operation information file in a user terminal 1 according to a first embodiment.

FIG. 4 is a flowchart showing the process of creating and transmitting the operation information file in the user terminal 1 according to the first embodiment. The process shown in FIG. 4 is started when a web page transmitted from the information providing server 2 is received and displayed by the user terminal 1 after a web browser is started in the user terminal 1 and thereafter the user terminal 1 logs in to the information providing server 2 by a login request (including a login ID and a password).

When the process shown in FIG. 4 is started, the web browser of the user terminal 1 determines whether or not a scroll operation is started by a user on the basis of an operation signal caused by a scroll operation from the operation unit (step S1). If the web browser determines that the scroll operation is started (step S1: YES), the web browser stores first coordinates of a certain pixel on the screen of the web page, which is displayed in the window screen, and proceeds to step S2. If the web browser determines that the scroll operation is not started (step S1: NO), the web browser proceeds to step S9.

In step S2, the web browser of the user terminal 1 obtains the content display area information (for example, coordinates of the content display area on the web page) related to the display area of the content displayed in the window screen immediately before the web page scroll is started.

Next, the web browser of the user terminal 1 performs a scroll process for scrolling the web page displayed in the window screen according to the scroll operation (step S3).

Next, the web browser of the user terminal 1 determines whether or not the scroll operation is ended on the basis of the operation signal caused by the scroll operation from the operation unit (step 4). If the scroll operation is absent for a predetermined time period (for example, 0.5 sec) (if the operation signal caused by the scroll operation is not transmitted from the operation unit for a predetermined time period), the web browser of the user terminal 1 determines that the scroll operation is ended (step S4: YES) and proceeds to step S5. On the other hand, if the web browser of the user terminal 1 determines that the scroll operation is not ended (step S4: NO), the web browser returns to step S3 and continues the scroll process.

In step S5, the web browser of the user terminal 1 obtains the content display area information related to the display area of the content displayed in the window screen immediately after the scroll of the web page.

Next, the web browser of the user terminal 1 calculates the amount of change by which the web page is scrolled according to the scroll operation and obtains the scroll change amount information indicating the amount of change (step S6).

Next, the web browser of the user terminal 1 obtains the scroll direction length information indicating the length of the window screen in the scroll direction (step S7).

Next, the web browser of the user terminal 1 obtains the page ID of the scrolled web page, creates the operation information file including the obtained page ID, the content display area information obtained in step S2 and step S5 described above, the scroll change amount information obtained in step S6 described above, and the scroll direction length information obtained in step S7 described above (step S8), and temporarily stores the operation information file in the RAM.

FIGS. 5A and 5B are conceptual diagrams of the web page shown in the window screen. The example shown in FIG. 5A shows a state of a web page P before scroll, and the example shown in FIG. 5B shows a state of the web page P after scroll. In the example shown in FIGS. 5A and 5B, the amount of change when the web page P (content C1) is scrolled is "d2", and the length of the window screen G in the scroll direction is "d1". The content display area information related to the display area AR1 of the content C1 displayed in the window screen G before scroll includes coordinate information (for example, coordinates of vertexes PO1 to PO4) for defining the range of the display area AR1. The content display area information related to the display area AR2 of (a part of) the content C1 and the content C2 displayed in the window screen G after scroll includes coordinate information (for example, coordinates of vertexes PO5 to PO8) for defining the range of the display area AR2.

In step S9, the web browser of the user terminal 1 determines whether or not the condition of transmission timing of the operation information file is satisfied. For example, when "a timing at which an scroll operation for performing a scroll from which the scroll operation information is obtained is ended" is defined as the transmission timing, if the condition of the transmission timing is satisfied (step S9: YES), the web browser proceeds to step S10, and if the condition of the transmission timing is not satisfied (step S9: NO), the web browser proceeds to step S11.

In step S10, the web browser of the user terminal 1 accesses the information providing server 2 on the basis of a predetermined IP address of the information providing server 2 and transmits the operation information file created in step S8 and the user ID stored in the RAM to the information providing server 2 via the network NW. The transmitted operation information file is deleted from the RAM.

As the transmission timing, "a timing at which a scroll operation for performing the next scroll is started after the scroll from which the scroll operation information is obtained is ended" may be defined. In this case, when a scroll operation for performing the next scroll is started after the scroll from which the scroll operation information is obtained is ended, the operation information file created in step S8 and the like are transmitted to the information providing server 2.

Alternatively, as the transmission timing, "a timing at which the user performs a specification (or selection) operation other than the scroll operation after the scroll from which the scroll operation information is obtained is ended" may be defined. In this case, when the user performs a specification (or selection) operation other than the scroll operation after the scroll is ended, the operation information file created in step S8 and the like are transmitted to the information providing server 2. Here, examples of the specification (or selection) other than the scroll operation by the user include specification (clicking by a mouse) by various buttons such as a purchase button, a reservation button, a settlement button and the like, and a specification for specifying a link to jump to other web page.

Alternatively, as the transmission timing, "a timing at which a predetermined time period has elapsed since the last transmission of the operation information file" may be defined. In this case, the operation information file created in step S8 and the like are transmitted to the information providing server 2 every predetermined time period (for example, every 1 minute).

Alternatively, as the transmission timing, "a timing at which a predetermined amount of data accumulation is detected" may be defined. In this case, the operation information file created in step S8 and the like are transmitted to the information providing server 2 every time a predetermined amount of data of the operation information file is accumulated.

In step S11, the web browser of the user terminal 1 determines whether or not an instruction was issued for ending the display of the web page. For example, when a close button (or a return button) of the web page is selected (clicked by a mouse) by the user, or when a hyperlink to jump to other web page is selected by the user, the web browser of the user terminal 1 determines that an instruction was issued for ending the display of the web page (step S11: YES) and ends the process. On the other hand, if the web browser of the user terminal 1 determines that no instruction was issued for ending the display of the web page (step S11: NO), the web browser proceeds to step S12, performs other processes (for example, a process according to an input operation by the user and the like), and returns to step S1.

(3.2. Registration of Scroll Change Amount Information and the Like)

Next, a registration process of the scroll change amount information and the like by the information providing server 2 according to the first embodiment will be described with reference to FIG. 6.

Figure 6:
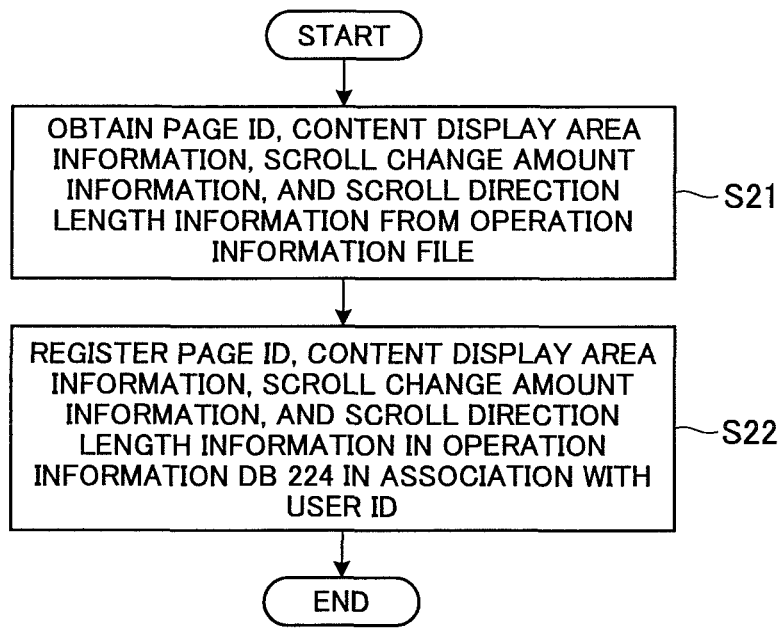
FIG. 6 is a flowchart showing a registration process of scroll change amount information and the like in a system control unit 24 of the information providing server 2 according to a first embodiment.

FIG. 6 is a flowchart showing the registration process of the scroll change amount information and the like in the system control unit 24 of the information providing server 2 according to the first embodiment. The process shown in FIG. 6 is started when the operation information file and the user ID transmitted from the user terminal 1 are received.

When the process shown in FIG. 6 is started, the system control unit 24 of the information providing server 2 obtains the page ID, the content display area information, the scroll change amount information, and the scroll direction length information from the received operation information file (step S21).

Next, the system control unit 24 registers the obtained page ID, content display area information, scroll change amount information, and scroll direction length information in the operation information database 224 in association with the received user ID (step S22) and ends the process.

(3.3. Providing Information Based on the Interest Presence or Absence Information)

Next, an information providing process based on the interest presence or absence information by the information providing server 2 according to the first embodiment will be described with reference to FIG. 7.

Figure 7:
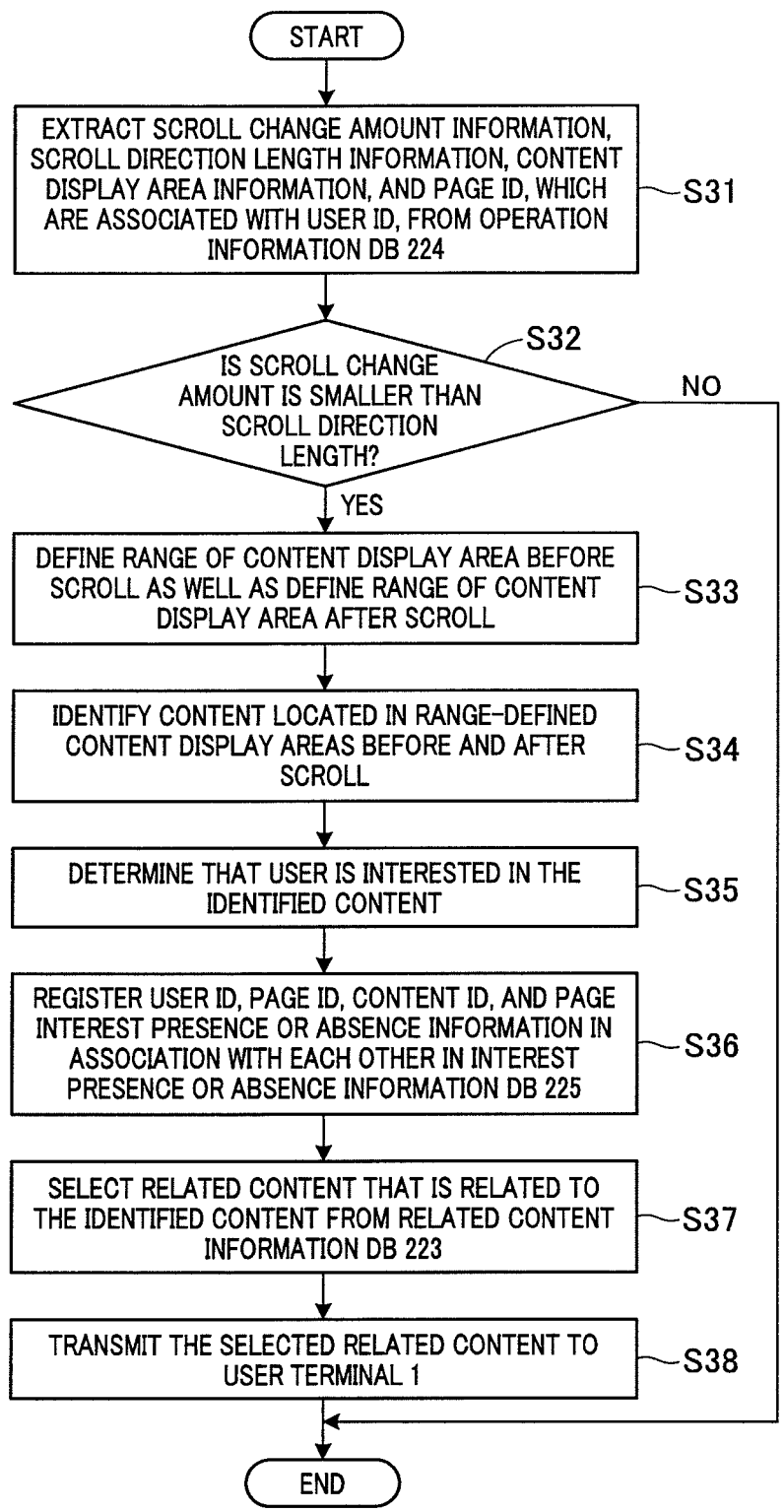
FIG. 7 is a flowchart showing an information providing process based on interest presence or absence information in the system control unit 24 of the information providing server 2 according to the first embodiment.

FIG. 7 is a flowchart showing the information providing process based on the interest presence or absence information in the system control unit 24 of the information providing server 2 according to the first embodiment. The process shown in FIG. 7 may be started following step S22 shown in FIG. 6 or is started when a predetermined process is performed (for example, when a related content browse button is clicked) in step S12 shown in FIG. 4 in the user terminal 1. Alternatively, it may be configured so that the process shown in FIG. 7 is started when a login is performed again after the process shown in FIG. 4 in the user terminal 1 is completed.

When the process shown in FIG. 7 is started, the system control unit 24 of the information providing server 2 extracts the scroll change amount information, the scroll direction length information, the content display area information, and the page ID, which are associated with the user ID identified by the login, from the operation information data base 224 (step S31).

Next, the system control unit 24 determines whether or not the user of the user terminal 1 is interested in the content identified by the extracted content identification information on the basis of the extracted information. Specifically, the system control unit 24 determines whether or not the amount of change (scroll change amount) indicated by the scroll change amount information is smaller than the length (scroll direction length) indicated by the scroll direction length information (step S32). If the system control unit 24 determines that the amount of change is smaller than the length (step S32: YES) (in the example shown in FIG. 5, this condition is satisfied because the amount of change d2<the length d1), the system control unit 24 proceeds to step S33. If the system control unit 24 determines that the amount of change is not smaller than the length (step S32: NO), the system control unit 24 ends the process.

In step S33, the system control unit 24 defines a range of the display area of the content in the window screen before scroll (in the example shown in FIG. 5A, the display area AR1) from the coordinate information included in the content display area information corresponding to the content display area before scroll, and defines a range of the display area of the content in the window screen after scroll (in the example shown in FIG. 5B, the display area AR2) from the coordinate information included in the content display area information corresponding to the content display area after scroll.

The fact that the amount of change in the scroll is smaller than the length of the window screen in step S32 described above means that, as shown in FIG. 5B, the display areas AR1 and AR2 of the content displayed in the window screen overlap each other (in the example shown in FIG. 5B, the overlap area is the area AR5).

Next, the system control unit 24 refers to the structured document of the web page corresponding to the extracted page ID, identifies the contents (in the example shown in FIGS. 5A and 5B, the content C1 and the content C2) arranged in the display areas of the contents before and after the scroll, ranges of which are defined, (step S34), and obtains the content IDs of the contents.

Next, the system control unit 24 determines that the user corresponding to the identified user ID is interested in the above-identified contents (step S35). In summary, considering that the user temporarily stops the scroll when the content in which the user is interested is displayed by the scroll, it is determined that the user is interested in the content displayed when the amount of change in the scroll is smaller than the length of the window screen (in other words, when the display areas of the content overlap each other).

Next, the system control unit 24 registers the identified user ID, the extracted page ID, the content ID of the identified content, and the page interest presence or absence information indicating that the user is interested in the content, which is determined as described above, in the interest presence or absence information database 225 in association with each other (step S36).

Figure 8:
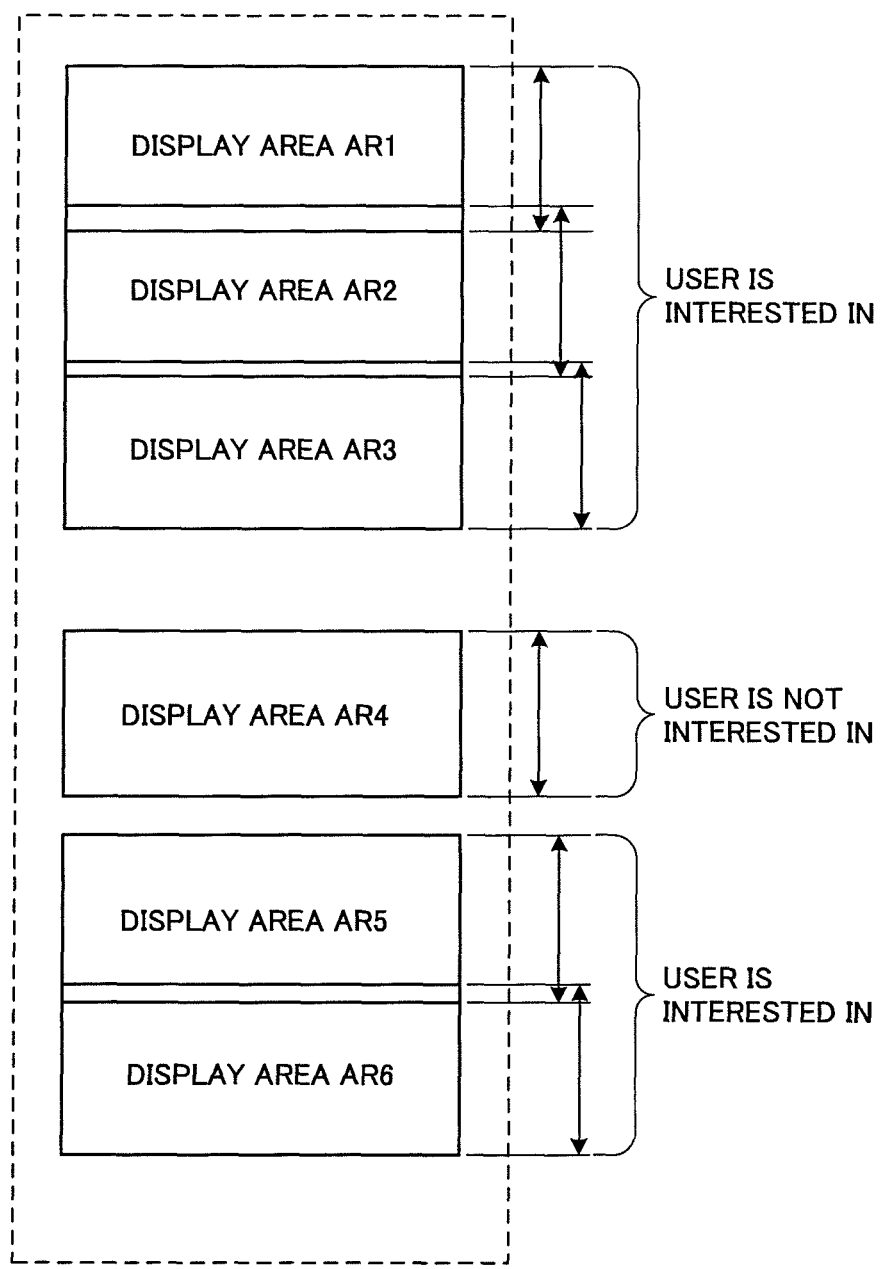
FIG. 8 is a conceptual diagram showing a presence or absence of user's interest for a plurality of scrolls performed in one web page.

FIG. 8 is a conceptual diagram showing a presence or absence of the user's interest for a plurality of scrolls performed in one web page. In the example shown in FIG. 8, the content display areas AR1 and AR2 on a web page overlap each other and the display areas AR2 and AR3 overlap each other, so that it is determined that the user is interested in the content included in a range of the display areas AR1 to AR3. On the other hand, although the content display areas AR4 and AR5 do not overlap each other, the content display areas AR5 and AR6 overlap each other, so that it is determined that the user is not interested in the content included in a range of the display area AR4, and on the other hand, it is determined that the user is interested in the content included in a range of the display areas AR5 to AR6.

Next, the system control unit 24 selects related content (for example, advertisement information of a product in which the user is determined to be interested and detailed information such as specifications of the product) that is related to the identified content by using the content ID of the above-identified content (the content in which the user is determined to be interested) as a key from the related content information database 223 (step S37).

Next, the system control unit 24 transmits the selected related content to the user terminal 1 (step S38). The related content transmitted as described above is displayed (that is, presented to the user) in a predetermined position on the window screen by the web browser of the user terminal 1. It may be configured so that the related content is described in an email and the email is transmitted to the email address of the user.

It may be configured so that the processes from step S31 to S36 described above are performed for all users whose user ID is registered every predetermined time interval (for example, every 12 hours) and thereafter the processes shown in steps S37 and S38 described above are performed when the information server 2 is accessed by the user terminal 1. According to this configuration, the selected related content can be more quickly presented to the user.

As described above, according to the above-described first embodiment, it is configured so that, when the amount of change in scroll of the web page according to the scroll operation is smaller than the length of the window screen in the scroll direction, it is determined that the user is interested in the content on the web page, so that it is possible to quickly determine which content the user is interested in among a plurality of contents included in the web page.

Since it is configured so that the related content that is related to the content in which the user is determined to be interested is presented to the user, it is possible to present information in which the user may be more interested and recommend a product or a service more effectively thereby.

When it is configured so that, when it is determined that the amount of change indicated by the scroll change amount information is smaller than or equal to the length indicated by the scroll direction length information, it is determined that the user is interested in the content on the web page identified by the content display area information, the same effect as that described above can also be achieved.

Although, in the first embodiment described above, an example in which the system control unit 24 of the information providing server 2 has functions as the information obtaining means, the storage means, and the determination means of the present invention is described, for example, a terminal program that causes a computer to function as these means may be plugged in to the web browser of the user terminal 1. In this case, when the amount of change in scroll of the web page according to the scroll operation is smaller than the length of the window screen in the scroll direction, the web browser of the user terminal 1 determines that the user is interested in the content on the web page and transmits the operation information file including the page interest presence or absence information indicating the presence or absence of the interest determined as described above, the page ID of the web page, the content ID of the content, and the user ID to the information providing server 2 via the network NW. For example, the terminal program of the present invention may be obtained (downloaded) from a predetermined server or the like via the network NW or may be recorded in a recording medium such as a CD or a DVD and read via a drive apparatus.

Second Embodiment (3.4. Creation and Transmission of Operation Information File)

Next, a process for creating and transmitting the operation information file by the user terminal 1 according to a second embodiment will be described with reference to FIG. 9.

Figure 9:
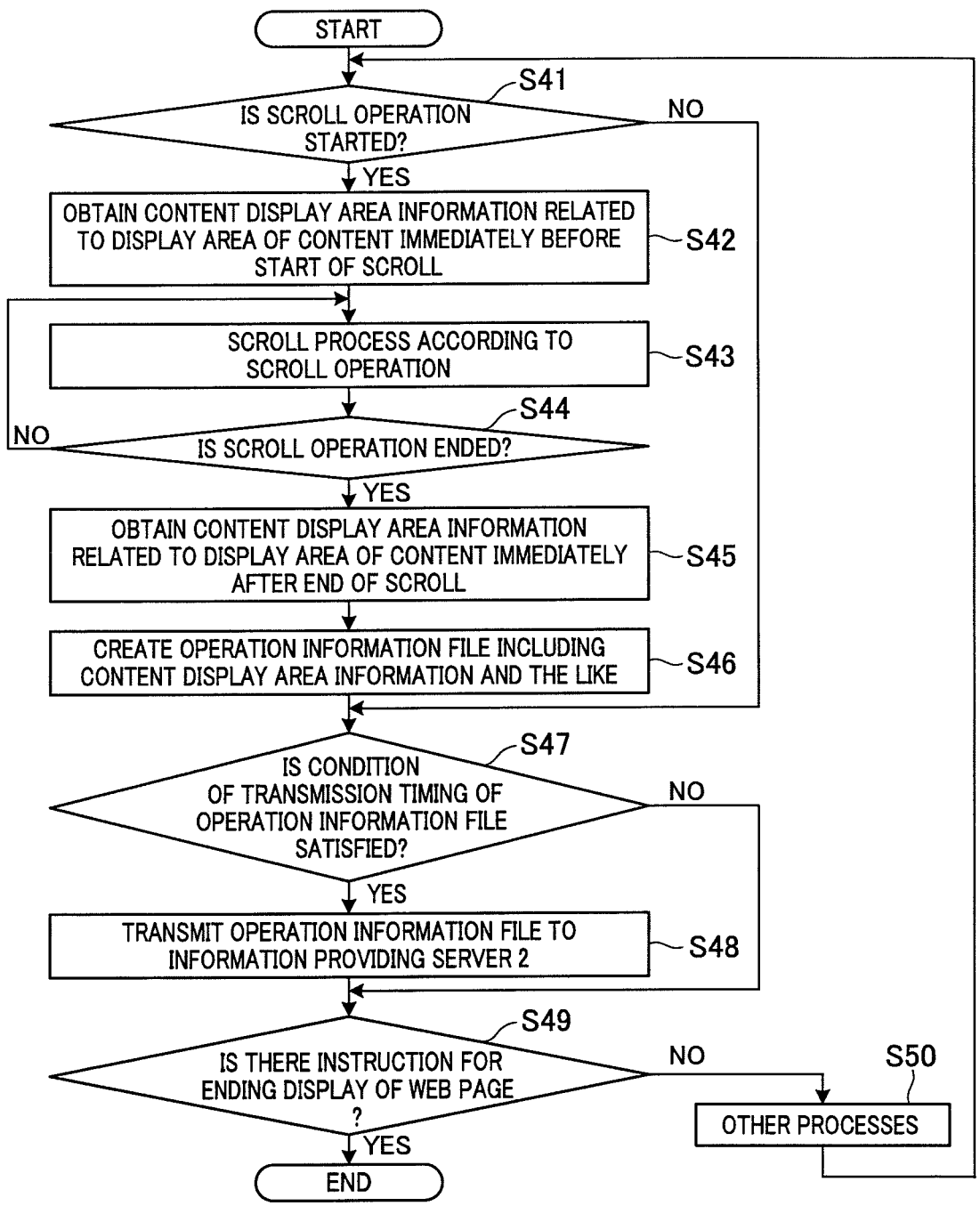
FIG. 9 is a flowchart showing a process of creating and transmitting an operation information file in a user terminal 1 according to a second embodiment.

FIG. 9 is a flowchart showing the process of creating and transmitting the operation information file in the user terminal 1 according to the second embodiment. In the same manner as in the first embodiment, the process shown in FIG. 9 is started when a web page transmitted from the information providing server 2 is received and displayed by the user terminal 1 after a web browser is started in the user terminal 1 and thereafter the user terminal 1 logs in to the information providing server 2 by a login request.

When the process shown in FIG. 9 is started, the web browser of the user terminal 1 determines whether or not a scroll operation is started by a user on the basis of an operation signal caused by a scroll operation from the operation unit (step S41). If the web browser determines that the scroll operation is started (step S41: YES), the web browser stores first coordinates of a certain pixel on the screen of the web page, which is displayed in the window screen, and proceeds to step S42. If the web browser determines that the scroll operation is not started (step S41: NO), the web browser proceeds to step S47.

The processes from step S42 to S45 are the same as those from step S2 to S5 shown in FIG. 4.

Next, the web browser of the user terminal 1 obtains the page ID of the scrolled web page, creates the operation information file including the obtained page ID and the content display area information (see FIG. 5) obtained in step S42 and step S45 described above (step S46), and temporarily stores the operation information file in the RAM.

The process of step S47 is the same as that of step S9 shown in FIG. 4.

In step S48, the web browser of the user terminal 1 accesses the information providing server 2 on the basis of a predetermined IP address of the information providing server 2 and transmits the operation information file created in step S46 and the user ID stored in the RAM to the information providing server 2 via the network NW. The transmitted operation information file is deleted from the RAM.

The transmission timing is the same as that in the first embodiment. The processes of step S49 and S50 are the same as those of step S11 and S12 shown in FIG. 4.

(3.5. Registration of Content Display Area Information and the Like)

Next, a registration process of the content display area information and the like by the information providing server 2 according to the second embodiment will be described with reference to FIG. 10.

Figure 10:
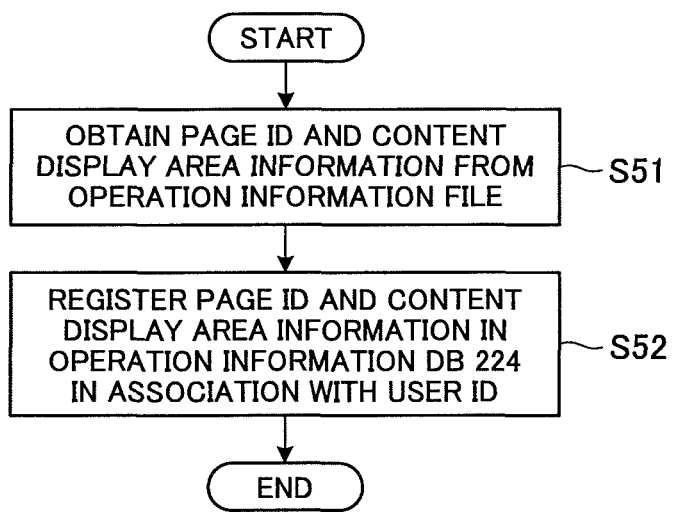
FIG. 10 is a flowchart showing a registration process of content display area information and the like in a system control unit 24 of an information providing server 2 according to the second embodiment.

FIG. 10 is a flowchart showing the registration process of the content display area information and the like in the system control unit 24 of the information providing server 2 according to the second embodiment. The process shown in FIG. 10 is started when the operation information file and the user ID transmitted from the user terminal 1 are received.

When the process shown in FIG. 10 is started, the system control unit 24 of the information providing server 2 obtains the page ID and the content display area information from the received operation information file (step S51).

Next, the system control unit 24 registers the obtained page ID and content display area information in the operation information database 224 in association with the received user ID (step S52) and ends the process.

(3.6. Information Providing Based on the Interest Presence or Absence Information)

Next, an information providing process based on the interest presence or absence information by the information providing server 2 according to the second embodiment will be described with reference to FIG. 11.

Figure 11:
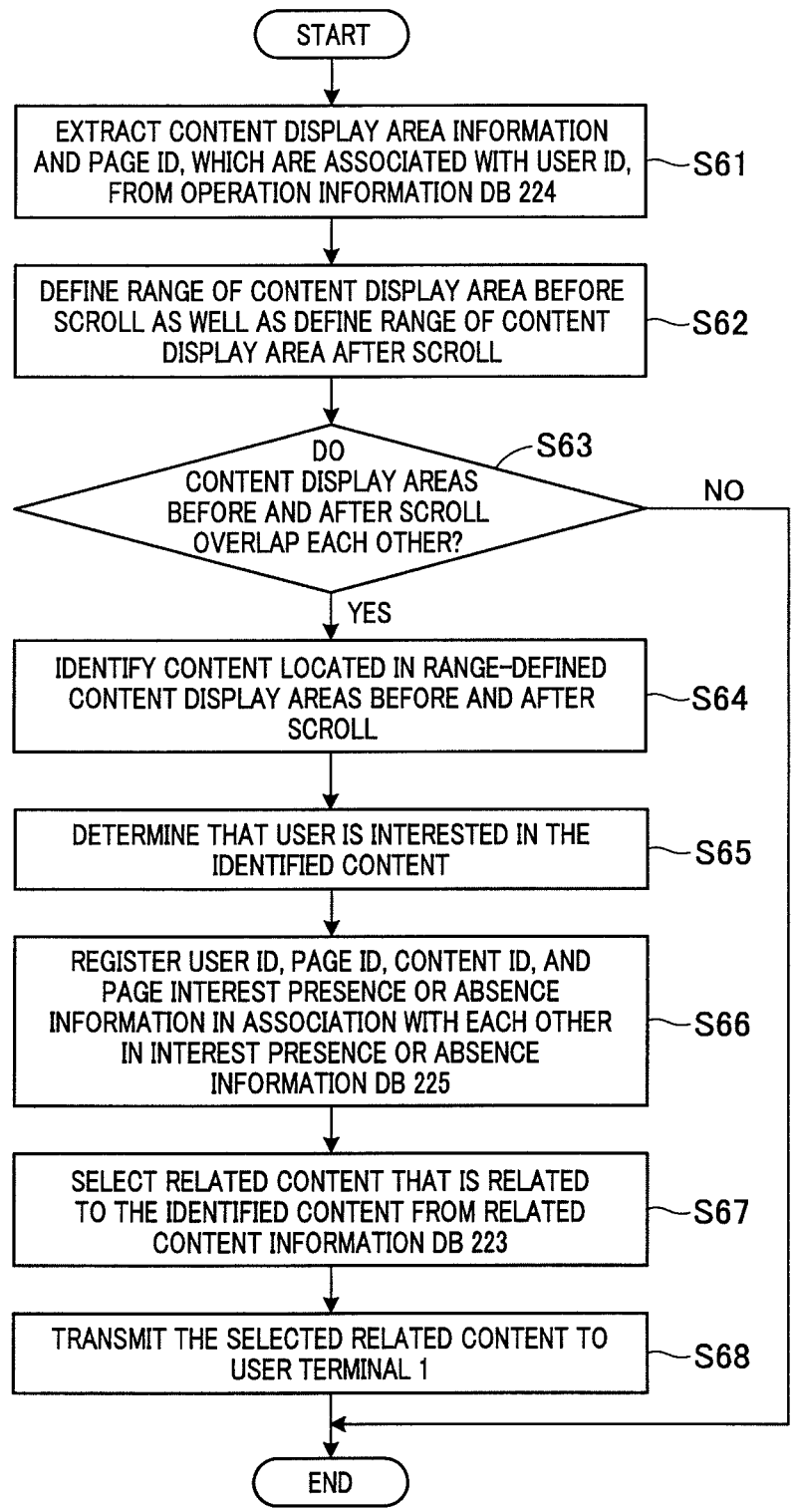
FIG. 11 is a flowchart showing an information providing process based on interest presence or absence information in the system control unit 24 of the information providing server 2 according to the second embodiment.

FIG. 11 is a flowchart showing the information providing process based on the interest presence or absence information in the system control unit 24 of the information providing server 2 according to the second embodiment. The process shown in FIG. 11 may be started following step S52 shown in FIG. 10 or is started when a predetermined process is performed (for example, when a related content browse button is clicked) in step S50 shown in FIG. 9 in the user terminal 1. Alternatively, it may be configured so that the process shown in FIG. 11 is started when a login is performed again after the process shown in FIG. 9 in the user terminal 1 is completed.

When the process shown in FIG. 11 is started, the system control unit 24 of the information providing server 2 extracts the content display area information and the page ID, which are associated with the user ID identified by the login, from the operation information data base 224 (step S61).

Next, the system control unit 24 determines whether or not the user of the user terminal 1 is interested in the content identified by the extracted content identification information on the basis of the extracted information. Specifically, the system control unit 24 defines a range of the display area of the content in the window screen before scroll (in the example shown in FIG. 5A, the display area AR1) from the coordinate information included in the content display area information corresponding to the content display area before scroll, and defines a range of the display area of the content in the window screen after scroll (in the example shown in FIG. 5B, the display area AR2) from the coordinate information included in the content display area information corresponding to the content display area after scroll (step S62).

Next, the system control unit 24 determines whether or not the content display area AR1 before scroll, the range of which is defined, and the content display area AR1 after scroll, the range of which is defined, overlap each other (step S63). If the system control unit 24 determines that the content display areas overlap each other (step S63: YES), the system control unit 24 proceeds to step S64, and if the system control unit 24 determines that the content display areas do not overlap each other (step S63: NO), the system control unit 24 ends the process. In the example shown in FIG. 5B, the display areas AR1 and AR2 of the content displayed in the window screen overlap each other (the overlap area is the area ARS).

The process of step S64 is the same as that of step S34 shown in FIG. 7.

Next, the system control unit 24 determines that the user corresponding to the identified user ID is interested in the identified contents (step S65). In summary, considering that the user temporarily stops the scroll when the content in which the user is interested is displayed by the scroll, it is determined that the user is interested in the content displayed when the content display areas overlap each other (see FIG. 8).

The processes from step S66 to S68 are the same as those from step S36 to S38 shown in FIG. 7.

In the same manner as in the first embodiment, it may be configured so that the processes from step S61 to S66 described above are performed for all users whose user ID is registered every predetermined time interval and thereafter the processes shown in steps S67 and S68 described above are performed when the information server 2 is accessed by the user terminal 1.

As described above, according to the above-described second embodiment, it is configured so that, when the content display area before the web page is scrolled and the content display area after the web page is scrolled overlap each other, it is determined that the user is interested in the content on the web page, so that it is possible to quickly determine which content the user is interested in among a plurality of contents included in the web page.

Since it is configured so that the related content that is related to the content in which the user is determined to be interested is presented to the user, it is possible to present information in which the user may be more interested and recommend a product or a service more effectively thereby.

Although, in the second embodiment described above, an example in which the system control unit 24 of the information providing server 2 has functions as the information obtaining means, the storage means, and the determination means of the present invention is described, for example, a terminal program that causes a computer to function as these means may be plugged in to the web browser of the user terminal 1. In this case, when the content display area before the web page is scrolled and the content display area after the web page is scrolled overlap each other, the web browser of the user terminal 1 determines that the user is interested in the content on the web page and transmits the operation information file including the page interest presence or absence information indicating the presence or absence of the interest determined as described above, the page ID of the web page, the content ID of the content, and the user ID to the information providing server 2 via the network NW.

DESCRIPTION OF REFERENCE NUMERALS

1 User terminal
2 Information providing server
21 Communication unit
22 Storage unit
23 Input/output interface unit
24 System control unit
25 System bus
NW Network
S Information providing system

The invention claimed is:

1. An information processing apparatus comprising:
an information obtaining unit that obtains information related to display of content when the content displayed in an active display area of a terminal apparatus scrolls according to a scroll operation by a user and content identification information for identifying the content from the terminal apparatus;
a storage unit that stores the obtained information related to display of the content and the content identification information in association with each other; and
a determination unit that extracts the information related to display of the content and the content identification information from the storage unit and determines whether or not a user of the terminal apparatus is interested in the content identified by the extracted content identification information on the basis of the extracted information related to display of the content, wherein
the information obtaining unit obtains amount of change information that indicates an amount of change in the content when the content scrolls according to a scroll operation by a user and length information that indicates a length of the active display area in a direction of the scroll as the information related to display of the content, wherein
the storage unit stores the obtained amount of change information, the length information, and the content identification information in association with each other, and wherein
the determination unit extracts the amount of change information, the length information, and the content identification information from the storage unit and determines whether or not an amount of change indicated by the extracted amount of change information is smaller than or equal to a length indicated by the extracted length information, and if the determination unit determines that the amount of change is smaller than or equal to the length, the determination unit determines that the user of the terminal apparatus is interested in the content identified by the extracted content identification information.

2. The information processing apparatus according to any one of claim 1, further comprising:
a related content selection unit that selects a related content that is related to the content in which the user is determined to be interested; and
a related content presentation unit that presents the selected related content to the user of the terminal apparatus.

3. A content of interest determination method performed by a computer, the method comprising:
a step of obtaining information related to display of content when the content displayed in an active display area of a terminal apparatus scrolls according to a scroll operation by a user and content identification information for identifying the content from the terminal apparatus;
a step of storing the obtained information related to display of the content and the content identification information in association with each other; and
a step of extracting the information related to display of the content and the content identification information from a storage unit and determining whether or not a user of the terminal apparatus is interested in the content identified by the extracted content identification information on the basis of the extracted information related to display of the content, wherein,
in the step of obtaining, amount of change information that indicates an amount of change in the content when the content scrolls according to a scroll operation by a user and length information that indicates a length of the active display area in a direction of the scroll are obtained as the information related to display of the content, wherein,
in the step of storing, the obtained amount of change information, the length information, and the content identification information are stored in association with each other; and wherein,
in step of extracting, the amount of change information, the length information, and the content identification information are extracted from the storage unit and it is determined whether or not an amount of change indicated by the extracted amount of change information is smaller than or equal to a length indicated by the extracted length information, and if it is determined that the amount of change is smaller than or equal to the length, it is determined that the user of the terminal apparatus is interested in the content identified by the extracted content identification information.

4. A terminal apparatus comprising:

an information obtaining unit that obtains information related to display of content when the content displayed in an active display area of the terminal apparatus scrolls according to a scroll operation by a user and content identification information for identifying the content;

a storage unit that stores the obtained information related to display of the content and the content identification information in association with each other; and a determination unit that extracts the information related to display of the content and the content identification information from the storage unit and determines whether or not a user of the terminal apparatus is interested in the content identified by the extracted content identification information on the basis of the extracted information related to display of the content, wherein the information obtaining unit obtains amount of change information that indicates an amount of change in the content when the content scrolls according to a scroll operation by a user and length information that indicates a length of the active display area in a direction of the scroll as the information related to display of the content, wherein the storage unit stores the obtained amount of change information, the length information, and the content identification information in association with each other; and wherein the determination unit extracts the amount of change information, the length information, and the content identification information from the storage unit and determines whether or not an amount of change indicated by the extracted amount of change information is smaller than or equal to a length indicated by the extracted length information, and if the determination unit determines that the amount of change is smaller than or equal to the length, the determination unit determines that the user of the terminal apparatus is interested in the content identified by the extracted content identification information.

5. A non-transitory recording medium that records a terminal program causing a computer to function as:

an information obtaining unit that obtains information related to display of content when the content displayed in an active display area of a terminal apparatus scrolls according to a scroll operation by a user and content identification information for identifying the content, a storage unit that stores the obtained information related to display of the content and the content identification information in association with each other, and a determination unit that extracts the information related to display of the content and the content identification information from the storage unit and determines whether or not a user of the user terminal is interested in content identified by the extracted content identification information on the basis of the extracted information related to display of the content, wherein the information obtaining unit obtains amount of change information that indicates an amount of change in the content when the content scrolls according to a scroll operation by a user and length information that indicates a length of the active display area in a direction of the scroll as the information related to display of the content, wherein the storage unit stores the obtained amount of change information, the length information, and the content identification information in association with each other; and wherein the determination unit extracts the amount of change information, the length information, and the content identification information from the storage unit and determines whether or not an amount of change indicated by the extracted amount of change information is smaller than or equal to a length indicated by the extracted length information, and if the determination unit determines that the amount of change is smaller than or equal to the length, the determination unit determines that the user of the terminal apparatus is interested in the content identified by the extracted content identification information.

6. An information providing system including a terminal apparatus and a server apparatus which the terminal apparatus can access via a network, the information providing system wherein the terminal apparatus includes an information obtaining unit that obtains information related to display of content when the content displayed in an active display area of the terminal apparatus scrolls according to a scroll operation by a user and content identification information for identifying the content from the terminal apparatus and a transmission unit that transmits the obtained information related to display of the content and the content identification information to the server apparatus, and the server apparatus includes a reception unit that receives the information related to display of the content and the content identification information transmitted from the terminal apparatus, a storage unit that stores the received information related to display of the content and the content identification information in association with each other, and a determination unit that extracts the information related to display of the content and the content identification information from the storage unit and determines whether or not a user of the terminal apparatus is interested in the content identified by the extracted content identification information on the basis of the extracted information related to display of the content, wherein the reception unit receives amount of change information that indicates an amount of change in the content when the content scrolls according to a scroll operation by a user and length information that indicates a length of the active display area in a direction of the scroll as the information related to display of the content, wherein the storage unit stores the obtained amount of change information, the length information, and the content identification information in association with each other; and wherein the determination unit extracts the amount of change information, the length information, and the content identification information from the storage unit and determines whether or not an amount of change indicated by the extracted amount of change information is smaller than or equal to a length indicated by the extracted length information, and if the determination unit determines that the amount of change is smaller than or equal to the length, the determination unit determines that the user of the terminal apparatus is interested in the content identified by the extracted content identification information.

* * * * *